Feb. 28, 1950        K. A. RIEDEL        2,498,897
BACKLASH COMPENSATOR

Filed Sept. 4, 1945        3 Sheets-Sheet 1

Inventor
Kurt A. Riedel
By W. D. O'Connor
Attorney

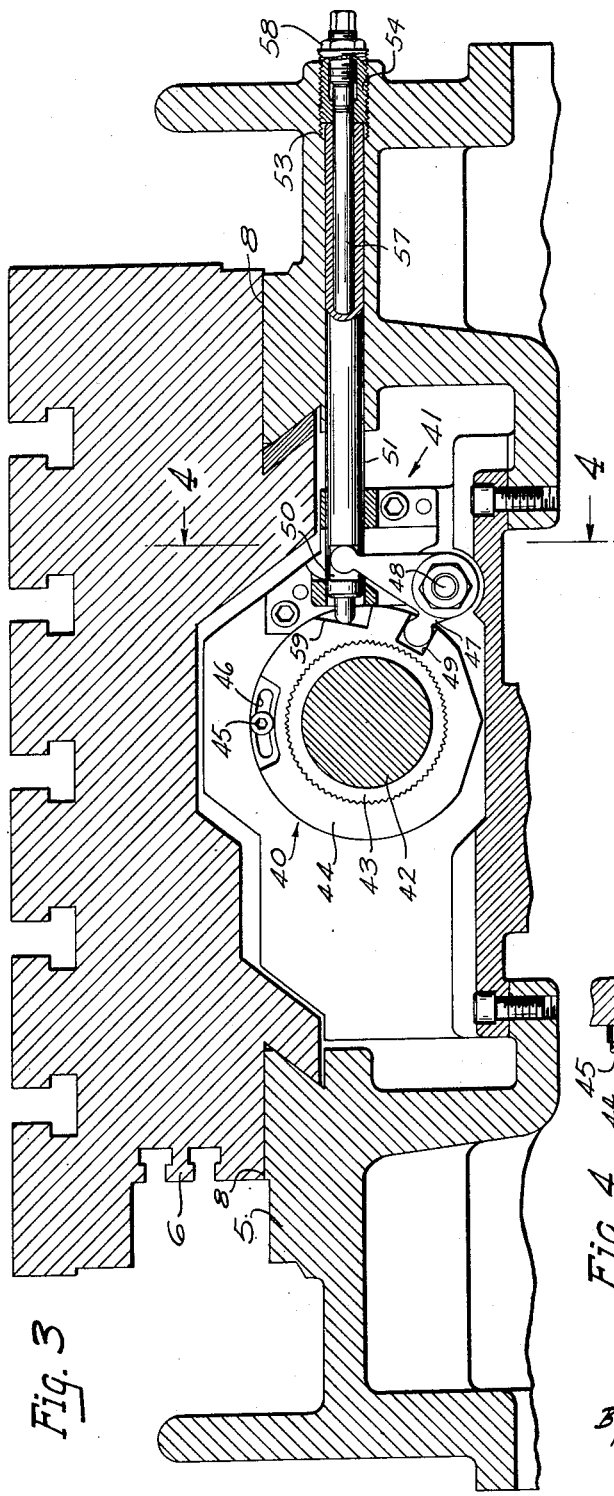
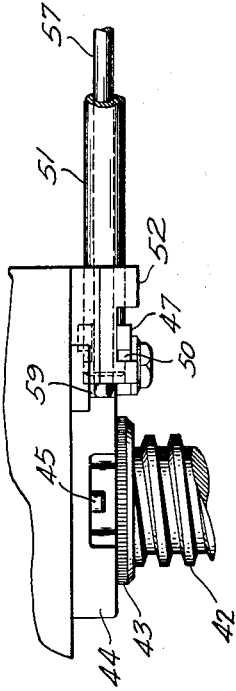
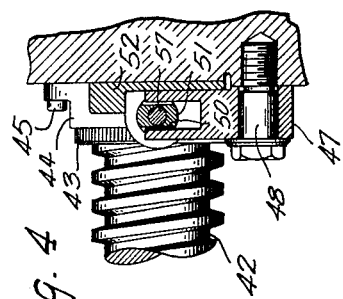

Patented Feb. 28, 1950

2,498,897

UNITED STATES PATENT OFFICE 2,498,897

BACKLASH COMPENSATOR

Kurt A. Riedel, Milwaukee, Wis., assignor to Kearney & Trecker Corporation, West Allis, Wis., a corporation of Wisconsin Application September 4, 1945, Serial No. 614,225

11 Claims. (Cl. 74—441)

This invention relates, generally, to an improvement in machine tool power transmission apparatus and more particularly to an improved backlash compensator for a screw and nut mechanism.

The primary object of this invention is to provide an improved backlash compensator.

Another object of this invention is to provide a backlash compensator especially adapted for use with a rotatable nut.

A further object of this invention is to provide, on a rotatable nut, an improved backlash compensator having positive adjusting and locking means.

Another object of the invention is to provide an improved arrangement for adjusting a backlash compensator on a machine tool screw and nut mechanism.

According to this invention, there is provided an improved backlash compensator, which may be adapted to either a rotatable or a non-rotatable nut of a screw and nut mechanism. The compensator nut comprises two elements, one element being adjustable relative to the other element to control the backlash factor. Adjustment of the degree of backlash is effected by turning one element relative to the other through actuation of a serrated yoke fitted on the adjustable nut element. Set secrews, associated with the yoke, provide means for effecting a precision setting of the adjustable nut element. Readily accessible openings are provided in the machine tool table through which the set screws may be adjusted.

The foregoing and other objects of the invention, which will become more fully apparent from the following detailed specification, may be achieved by means of the exemplifying embodiments, depicted in and described in connection with the accompanying drawings, in which:

Fig. 3 is a view in transverse section of a modified backlash eliminator and associated adjusting mechanism adapted for use with a non-rotatable nut;

Fig. 4 is a detail view of the adjusting means, taken in vertical longitudinal section on the plane indicated by the line 4—4 in Fig. 3; and Fig. 5 is a top view of the backlash compensator adjusting means shown in Fig. 3.

Figure 1:
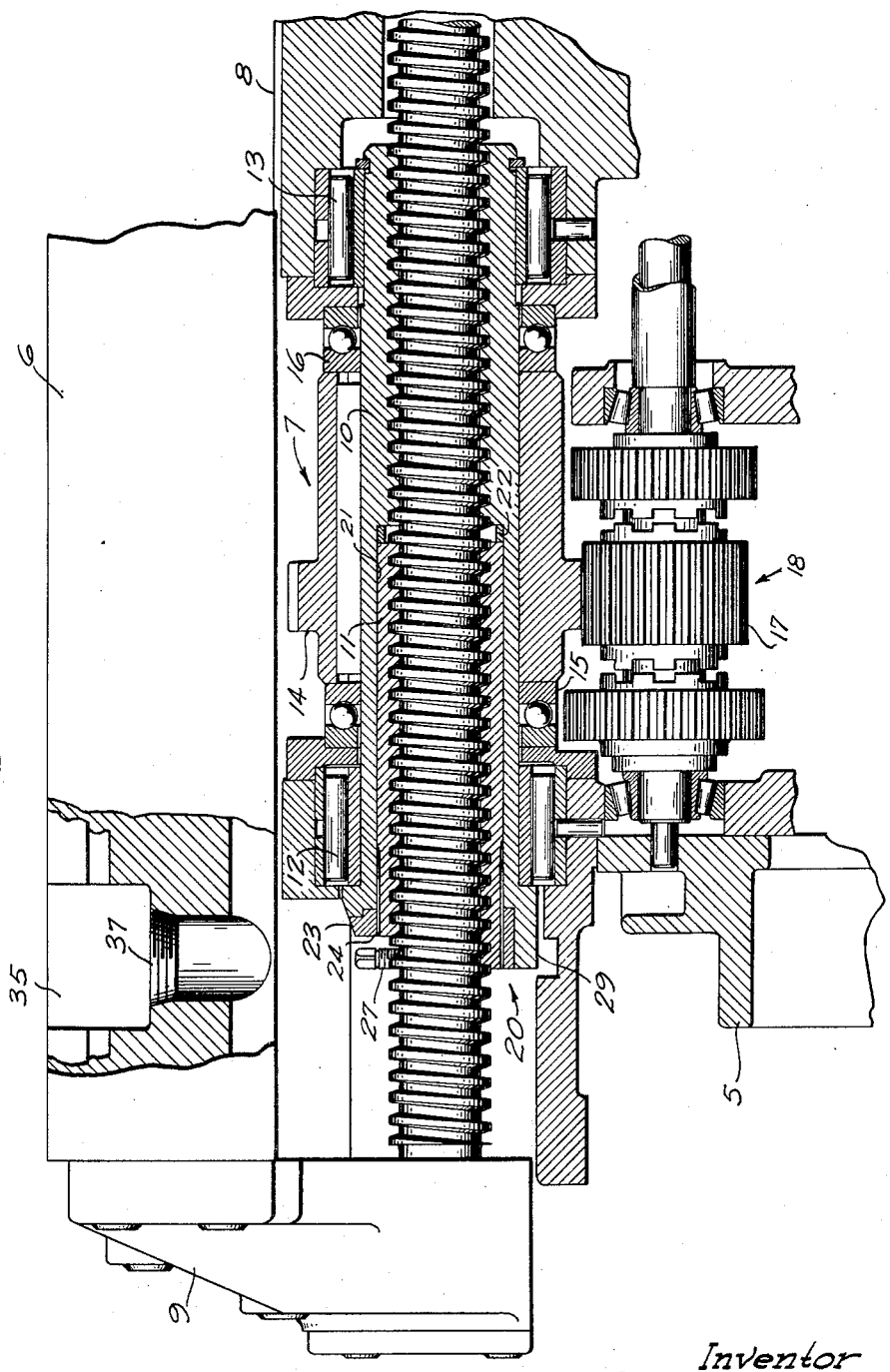
Figure 1 is a view, taken in vertical longitudinal section, of a machine tool table driving screw and nut mechanism of the rotatable nut type incorporating a backlash eliminator exemplifying the invention.

The mechanism shown in Fig. 1, as illustrative of apparatus incorporating the features of the invention, constitutes a portion of a milling machine, which may be of any suitable construction and is here represented by parts of a supporting bed 5 and a superimposed work table 6. A screw and nut mechanism 7, operatively interconnecting the bed and table, serves to effect movement of the table 6 along ways 8 on the bed in a well known manner. The screw, in this instance, is fixedly mounted in end brackets 9 attached to each end of the table 6, (only the left bracket being shown) while the nut is rotatably journalled approximately in the center of the bed 5 and disposed to threadably receive the screw. The nut consists of two elements, namely; a driving nut element 10 and an adjustable supplemental nut element 11. These nut elements are interfitted in telescopic abutting relationship, the outer or driving element 10 being rotatably mounted in a pair of roller bearings 12 and 13 disposed in axial alignment with the table screw.

The periphery of the driving nut 10 is splined to receive a correspondingly splined driving gear 14 which is secured upon it against axial movement and, in turn, is rotatably retained in the bed 5 between a pair of thrust bearings 15 and 16. The gear 14 is driven from a shiftable gear 17, constituting part of a reversing mechanism 18. The mechanism 18 is selectively driven at one of a plurality of speeds through the usual power driven transmission mechanism (not shown), in a well known manner.

A backlash eliminator 20, incorporating the features of the invention as applied to the screw and nut drive mechanism of a machine tool, serves to control the backlash between the nut and the screw. As the nut is driven to effect movement of the table 6 along the bed 5, wear occurs on both the nut and screw elements, resulting in looseness between the movable parts, which is known as backlash. In a precision machine, backlash in the drive mechanism results in chatter and inaccuracies in the cutting or grinding operations upon a workpiece and, consequently, must be controlled.

The backlash compensator 20 is built integrally with the nut in manner to permit rotation of the nut under power or manual drive. Both nut elements 10 and 11 are cylindrical or tubular in form, with the outside diameter of the adjustable nut 11 slightly smaller than a receiving socket or bore 21 in the driving nut 10, the arrangement being such that the adjusting nut 11 is received telescopically in the bore 21 and is normally positioned to abut against a spacing collar 22 disposed at the inner end of the bore.

Figure 2:
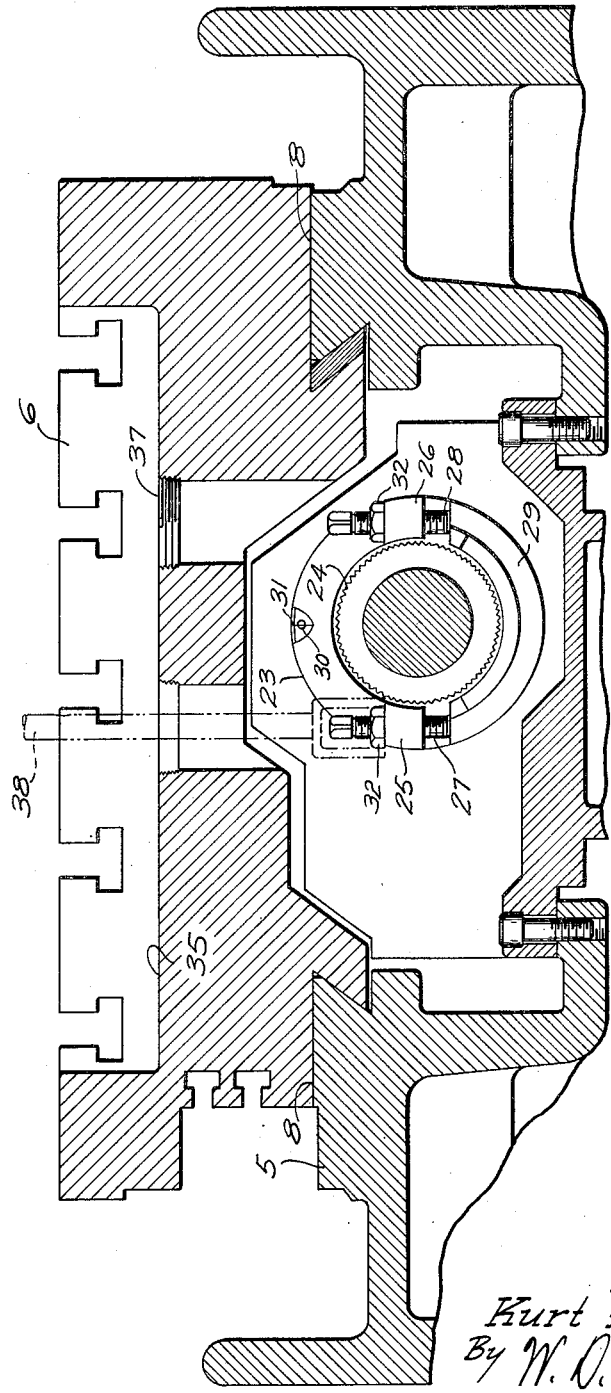
Fig. 2 is a vertical transverse sectional view of the table screw and nut mechanism, showing the backlash eliminator in end elevation.

As shown in Figs. 1 and 2, the outer end of the adjustable nut 11 is serrated circumferentially to receive an adjusting yoke member 23 having complementary internal serrations 24. The yoke 23 may be selectively positioned on the nut 11 at any predetermined angle. Two lugs 25 and 26, as shown in Fig. 2, extend axially or forwardly outward on opposite sides of the yoke 23. Each is threaded to receive one of a pair of adjusting set screws 27 and 28. The ends of the screws 27 and 28 engage adjusting abutments constituted by the respective ends of an axially extending arcuate flange 29 integrally formed on the end of the driving nut element 10.

Backlash or lost motion in the screw and nut mechanism 7 is readily controlled or eliminated by effecting an angular adjustment between the driving nut 10 and the adjustable nut 11. A coarse adjustment is made by turning the nuts to establish abutting relationship and then by positioning the yoke 23 on the adjustable nut 11 in a manner to align a zero mark 30 on the nut 11 with a line 31 on the driving nut 10. When thus aligned, the yoke lugs 25 and 26 will be evenly spaced from the extending flange 29 on the nut 10. The precision adjustment is then made by turning the adjusting screws 27 and 28 until the degree of engagement between the nut and the screw permits free operation of the movable member 6 with the backlash reduced to a minimum. Lock nuts 32 are provided for retaining the set screws in position. With the adjustment completed, the driving nut 10 tends to exert force on the left faces of the screw threads, as viewed in Fig. 1, to prevent any axial movement to the left, while the adjustable nut 11 exerts force on the right faces of the screw threads to prevent any axial movement to the right.

One of the greatest hindrances to accurately adjusting the backlash in the screw and nut mechanism of a machine tool, especially those of the bed type, in which the mechanism is completely covered by the movable table, is the inaccessibility of the backlash compensator. In the machine shown in Figs. 1 and 2, access to the compensator is provided through openings in a chip trough 35, constituting the left end of the table 6. Two screw plugs 37 are threadedly retained in openings in the trough 35, which, when the plugs are removed, afford access to the two adjusting screws 27 and 28 in order that a precision adjustment of the compensator may be made without dismantling the machine. In Fig. 2, a socket wrench 38 is indicated in broken lines applied to the lock nut on the set screw 27 to exemplify the means of adjustment. Thus, the compensator can be adjusted without removing the table 6 from the bed 5 or removing the end bracket 9 from the left end of the table 6, as is presently necessary. The operator need only position the table to place the openings over the compensator yoke and then turn the nut to bring the adjusting screws uppermost, whereupon, after removing the plugs 37, the backlash compensator may be adjusted in a minimum of time.

A non-rotatable type of backlash eliminator 40, with an improved adjusting mechanism 41, is shown in Figs. 3, 4 and 5. With this adjusting mechanism, it is possible to adjust and lock the compensator from a single station on the exterior of the machine bed. The backlash eliminator 40 constitutes a part of the nut of a screw and nut mechanism 42 adapted to drive the table 6 slidably mounted on the bed 5, as previously described. An adjustable nut 43 is threadedly mounted on the screw in abutting relationship with a stationary nut (not shown) mounted in the bed 5. As shown in Fig. 3, the end of the nut 43 is serrated to receive an internally serrated yoke 44 at any predetermined angle. The yoke 44 is retained against axial movement on the nut 43 by a bolt 45 extending through an arcuate slot 46 and anchored in the bed 5. The length of the slot 46 serves to limit the range of backlash adjustment for a given position of the yoke 44 on the adjustable nut 43. As previously explained, the adjustable nut 43 may be rotated to a position in which it imparts force to the screw to counteract the backlash or lost motion between the screw and nut.

The adjusting mechanism 41 is mounted in the bed 5 and serves to effect a precision adjustment of the yoke 44 and the nut 43. The adjustment is effected from a single point on the front side of the bed 5. A bellcrank 47, constituting a part of the mechanism 41, is pivotally mounted on a pin 48, fixedly retained in the bed 5. The lower arm of the bellcrank extends into a radial slot 49 in the yoke 44, in such manner that pivotal movement of the bellcrank effects rotative movement of the yoke.

The other arm of the bellcrank 47 is forked to ride in slots 50, disposed on opposite sides of a hollow actuating or adjusting rod or sleeve 51, horizontally mounted in the bed 5, as best shown in Figs. 3 and 5. The rod is disposed for axial movement only in the bed, with the forked arms of the bellcrank serving to prevent rotation thereof. The inner end of the rod is slidably supported in a bracket 52, while the outer end extends into a threaded bore 53 at the front of the machine bed 5.

An externally threaded hollow adjusting nut or member 54, having threaded engagement with the bore 53, normally abuts the outer end of the rod 51. Clockwise rotation of the nut member 54 effects an axial inward movement of the rod 51. The consequent pivotal movement of the bellcrank 47 serves to effect a clockwise movement of the adjusting yoke 44 and the adjustable nut element 43 to take up any lost motion or backlash in the screw and nut mechanism.

The adjusting and locking mechanism 41 also includes means to lock the yoke and nut in any adjusted position. For this purpose, a lock rod 57, having a rounded tip on the inner end, is disposed for axial movement within the hollow actuating rod 51. A locking stud 58 is threadedly retained in an internally threaded chamber in the hollow adjusting nut 54, with its inner end abutting the outer end of the locking rod 57. After a precision adjustment of the adjustable nut 43 has been effected, the stud 58 is tightened to force the inner end of the rod 57 into locking engagement with a tapered notch 59 on the periphery of the yoke 44.

Thus, the non-rotatable backlash compensator 40, together with the associated adjusting and locking mechanism 41 is locked in any adjusted position from the same station on the machine bed 5. The main advantage of this type of backlash compensator adjusting means is that an adjustment can be made from a single station on the machine, readily accessible at all times.

From the foregoing detailed description of the illustrative structure set forth herein to disclose the teachings of the invention, it is apparent that there has been provided an improved backlash compensator to control backlash in a screw and nut mechanism, together with an adjusting and locking mechanism therefor. While the invention is shown applied to a machine tool structure, it may be readily applied to other types of screw and nut mechanisms with equal utility.

Although the invention has been described in considerable detail, in order to fully disclose the invention and its application, it is to be understood that the particular apparatus shown and described is intended to be illustrative only and that the various novel features of the invention may be incorporated in other structural forms, without departing from the spirit and scope of the invention, as described in the subjoined claims:

The principles of the invention having now been fully explained in connection with the foregoing description of an illustrative preferred embodying structure, I hereby claim as my invention or discovery:

1. In a backlash eliminator for a machine tool screw and nut drive mechanism, a rotatable nut presenting adjusting abutment means carried on the screw, an adjustable nut carried on the screw and abutting said first-named nut, an adjusting yoke selectively keyed to said adjustable nut at a selected predetermined angle, and set screws threadedly carried in said yoke and disposed to abut and cooperate with said adjusting abutment means on said rotatable nut, whereby precision adjustment between said abutting nuts and said screw may be effected by changing the setting of said set screws without impairing the rotative operation of said nut elements on said screw.

2. An adjustable nut of the rotatable type comprising a cylindrical element having internal screw engaging threads and provided at one end with circumferential serrations, an adjusting member arranged to engage said serrations at a selected one of a plurality of positions, another element having internal screw engaging threads and provided at one end with a projecting portion presenting an axially disposed cylindrical socket for receiving the non-serrated end of said cylindrical nut element in telescopic abutting relationship, and an adjusting device interposed between said adjusting member and the projecting portion of said socketed nut element and adapted to effect angular adjustment between said nut elements for regulating backlash between said nut and a cooperating screw.

3. An adjustable nut of the rotatable type, comprising a cylindrical element having internal screw engaging threads and provided at one end with circumferential serrations, another element having internal screw engaging threads and provided at one end with a coaxial socket for receiving said cylindrical element in telescopic abutting relationship, and adjusting means arranged to engage said serrations at a selected one of a plurality of angular positions and to engage and bear upon said other element, whereby said elements may be adjusted angularly relative to each other to regulate the degree of backlash between said adjustable nut and a cooperating screw without interfering with rotation of said nut as a unit.

4. An adjustable rotatable nut for a screw and nut drive mechanism, comprising an element having a screw engaging threaded portion and an axially extending tubular portion, a second element having screw engaging threads and adapted to fit within the tubular portion of said first element in telescopic abutting relationship therewith, said second element presenting circumferential serrations, an adjusting yoke provided with internal serrations complementary to the serrations on said second element and adapted to engage it at selected angular positions, and adjusting means operating between said yoke and said first element for effecting angular adjustment therebetween in regulating the degree of backlash between said rotatable nut and a cooperating screw.

5. In a screw and nut drive mechanism for a machine tool including a screw and a nut rotatably mounted in cooperating relationship with said screw, said nut comprising a first nut element having a screw engaging portion and a contiguous cylindrical socket portion, a second nut element having a screw engaging portion telescopically received within the cylindrical socket portion of said first nut element, adjusting means arranged to adjust the angular relationship between said nut elements to regulate the degree of backlash between said screw and said nut, and means to rotate said nut.

6. A rotatable backlash compensator for a screw and nut mechanism comprising a screw, a rotatable nut element threadably carried on said screw, an adjustable nut element threadedly carried on said screw in abutting relationship with said rotatable element, and an adjusting means operable upon said rotatable element and said adjustable element simultaneously for adjusting their angular relationship to vary the degree of pressure between said elements and said screw and thus control backlash between said screw and nut.

7. In a backlash compensator for a machine tool screw and nut mechanism, a non-rotatable screw, a power driven nut element presenting adjusting abutment means and disposed to engage said screw, an adjustable nut element disposed to engage said screw adjacent to said power driven nut element and presenting a serrated peripheral surface, a serrated adjusting yoke adapted to be mounted on said adjustable nut element at any predetermined angular position, and adjusting screws threadably mounted in said yoke in a position to engage and cooperate with said adjusting abutment means on said power driven nut element for effecting adjustment between said nut elements.

8. In a machine tool, a bed, a machine member movably mounted on said bed, a feed screw mounted in said movable member, a nut element presenting adjusting abutment means rotatably mounted in said bed and positioned to cooperate with said feed screw, an adjusting nut element rotatably mounted on said screw adjacent to said rotatable nut element, a drive means to rotate said nut elements on said screw to effect movement of said member, an adjusting yoke selectively keyed to said adjusting nut at a selected angular position to provide coarse adjustment of said nut, adjusting screws threadably carried in said yoke and disposed to engage and cooperate with said adjusting abutment means on said rotatable nut element in a manner to effect relative adjustment of said nut elements, and removable plugs in said machine member to provide access to said adjusting yoke and screws.

9. In a backlash eliminating screw and nut mechanism, a non-rotatable screw, a rotatable driving nut presenting an abutment element extending axially at one end thereof in radially spaced relationship with said screw, said nut having threaded engagement with said screw, an adjusting nut threaded on said screw in abutting relationship with said driving nut inwardly of said abutment element and presenting external serrations, an internally serrated yoke presenting radially projecting adjusting lugs, said yoke being selectively fitted on said adjusting nut with said lugs in angularly spaced relationship with said abutment element of said driving nut, and means to adjust the angular relationship of said lugs and said abutment element, whereby said adjusting nut may be turned relative to said driving nut to adjust the degree of axial reaction between said nuts and said screw, the arrangement being such that said driving nut and said adjusting nut may be rotated as a unit relative to said non-rotatable screw.

10. A backlash compensator for a screw and nut mechanism including a screw and a rotatably mounted cooperating nut, comprising a driving nut element disposed in threaded relationship with the screw and presenting a pair of adjusting abutments, an adjusting nut element disposed in threaded relationship with the screw and in abutting relationship with said driving nut element and presenting peripheral serrations, an adjusting ring presenting complementary internal serrations adapted to engage the serrations of said adjusting nut element in selected angular relationship and presenting a pair of screw receiving lugs, and adjusting screws threadedly received in said lugs and disposed to engage said adjusting abutments on said driving nut element respectively for effecting angular adjustments between said nut elements to adjust the degree of tightness between the nut and the screw and to retain said elements in adjusted abutting relationship for unitary rotation.

11. An adjustable nut of the rotatable type, comprising a cylindrical nut element having internal screw engaging threads and provided at one end with adjusting means receiving surfaces, another nut element having internal screw engaging threads and provided at one end with adjusting abutments and a coaxial socket for receiving the other end of said cylindrical nut element in telescopic abutting relationship, and adjusting means arranged to engage said receiving surfaces on said cylindrical nut element at a selected angular position and to engage and bear upon said adjusting abutments, whereby said abutting nut elements may be adjusted angularly relative to each other to regulate the degree of backlash between them and a cooperating screw without interfering with rotation of said adjustable nut as a unit.

KURT A. RIEDEL.

REFERENCES CITED

The following references are of record in the file of this patent:

UNITED STATES PATENTS

| Number | Name | Date |
|---|---|---|
| 1,153,861 | Dudley et al. | Sept. 14, 1915 |
| 1,707,442 | Maag | Apr. 2, 1929 |
| 1,813,626 | Landahl | July 7, 1931 |
| 1,965,221 | DeHaas | July 3, 1934 |
| 2,264,302 | Devlin | Dec. 2, 1941 |
| 2,385,907 | Armitage et al. | Oct. 2, 1945 |